United States Patent
Okada (10) Patent No.: US 11,651,282 B2
(45) Date of Patent: May 16, 2023

(54) LEARNING METHOD FOR LEARNING ACTION OF AGENT USING MODEL-BASED REINFORCEMENT LEARNING

(71) Applicant: Panasonic Intellectual Property Corporation of America, Torrance, CA (US)

(72) Inventor: Masashi Okada, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 398 days.

(21) Appl. No.: 16/918,390

(22) Filed: Jul. 1, 2020

(65) Prior Publication Data

US 2021/0004717 A1  Jan. 7, 2021

Related U.S. Application Data

(60) Provisional application No. 62/870,918, filed on Jul. 5, 2019.

(30) Foreign Application Priority Data

Mar. 25, 2020  (JP) .............................. JP2020-053613

(51) Int. Cl.
  *G06N 20/00*  (2019.01)
  *G06N 5/043*  (2023.01)

(52) U.S. Cl.
  CPC ............. *G06N 20/00* (2019.01); *G06N 5/043* (2013.01)

(58) Field of Classification Search
  None
  See application file for complete search history.

(56) References Cited

U.S. PATENT DOCUMENTS

2013/0339278 A1* 12/2013 Aoki ...................... G06N 20/00
706/12

OTHER PUBLICATIONS

Chua, Kurtland, et al. "Deep reinforcement learning in a handful of trials using probabilistic dynamics models." Advances in neural information processing systems 31 (2018). (Year: 2018).*

(Continued)

*Primary Examiner* — Daniel T Pellett
(74) *Attorney, Agent, or Firm* — Wenderoth, Lind & Ponack, L.L.P.

(57) ABSTRACT

A learning method for learning an action of an agent using model-based reinforcement learning is provided. The learning method includes: obtaining time series data indicating states and actions of the agent when the agent performs a series of actions; establishing a dynamics model by performing supervised learning using the time series data obtained; deriving a plurality of candidates for an action sequence of the agent from variational inference using a mixture model as a variational distribution, based on the dynamics model; and outputting, as the action sequence of the agent, one candidate selected from among the plurality of candidates derived.

5 Claims, 6 Drawing Sheets

(56) References Cited

OTHER PUBLICATIONS

Stern, Hal. "Probability models on rankings and the electoral process." Probability models and statistical analyses for ranking data. Springer, New York, NY, 1993. 173-195. (Year: 1993).*
Haarnoja, Tuomas, et al. "Soft actor-critic: Off-policy maximum entropy deep reinforcement learning with a stochastic actor." International conference on machine learning. PMLR, 2018. (Year: 2018).*
Kurtland Chua, et al., "Deep Reinforcement Learning in a Handful of Trials using Probabilistic Dynamics Models", 32nd Conference on Neural Information Processing Systems, 2018.

* cited by examiner

LEARNING METHOD FOR LEARNING ACTION OF AGENT USING MODEL-BASED REINFORCEMENT LEARNING

CROSS REFERENCE TO RELATED APPLICATIONS

The present application is based on and claims priority of U.S. Provisional Patent Application No. 62/870,918 filed on Jul. 5, 2019 and Japanese Patent Application No. 2020-053613 filed on Mar. 25, 2020. The entire disclosures of the above-identified applications, including the specifications, drawings and claims are incorporated herein by reference in their entireties.

FIELD

The present invention relates to a learning method and a recording medium.

BACKGROUND

One of learning methods for controlling an agent is a method employing an uncertainty-aware dynamics model (see Non Patent Literature (NPL) 1). Here, agent refers to a body that performs an action with respect to the environment.

CITATION LIST

Non Patent Literature

NPL 1: K. Chua, R. Calandra, R. McAllister, and S. Levine. "Deep reinforcement learning in a handful of trials using probabilistic dynamics models. In NeurIPS, 2018."

SUMMARY

Technical Problem

However, the learning method for controlling the action of an agent has room for improvement.

In view of this, the present disclosure provides a learning method for improving the action of an agent.

Solution to Problem

A learning method according to an aspect of the present disclosure is a learning method for learning an action of an agent using model-based reinforcement learning. The learning method includes: obtaining time series data indicating states and actions of the agent when the agent performs a series of actions; establishing a dynamics model by performing supervised learning using the time series data obtained; deriving a plurality of candidates for an action sequence of the agent from variational inference using a mixture model as a variational distribution, based on the dynamics model; and outputting, as the action sequence of the agent, one candidate selected from among the plurality of candidates derived.

It should be noted that these general and specific aspects may be implemented using a system, a method, an integrated circuit, a computer program, a computer-readable recording medium such as a CD-ROM, or any combination of systems, methods, integrated circuits, computer programs, or computer-readable recording media.

Advantageous Effects

A learning method according to the present disclosure can improve a learning method for controlling the action of an agent.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

A learning method according to an aspect of the present disclosure is a learning method for learning an action of an agent using model-based reinforcement learning. The learning method includes: obtaining time series data indicating states and actions of the agent when the agent performs a series of actions; establishing a dynamics model by performing supervised learning using the time series data obtained; deriving a plurality of candidates for an action sequence of the agent from variational inference using a mixture model as a variational distribution, based on the dynamics model; and outputting, as the action sequence of the agent, one candidate selected from among the plurality of candidates derived.

According to the aspect, the variational inference is performed using the mixture model as the variational distribution, and thus it is possible to derive the multiple candidates for the action sequence of the agent. Each of the candidates for the action sequence derived in such a manner has a smaller difference from the optimum action sequence and converges earlier in the deriving of the candidates than the case where the variational inference is performed using a single model as the variational distribution. One of the derived candidates for the action sequence will be used as the action sequence of the agent. With this, a more appropriate action sequence can be outputted in a shorter time.

Thus, according to the aspect, it is possible to improve the learning method for controlling the agent.

For example, the learning method may further includes obtaining, as the time series data, new time series data indicating states and actions of the agent when the agent performs a series of actions in accordance with the action sequence outputted.

According to the aspect, the state and the action of the agent controlled using the action sequence outputted as the result of the learning are used in the next learning, and thus it is possible to make an action sequence to be established as the result of the learning more appropriate. Thus, the learning method for controlling the agent can be further improved.

For example, in the deriving of the plurality of candidates, a mixture ratio of a probability distribution for each of the plurality of candidates to an entirety of the mixture model may be derived together with the plurality of candidates, and in the selecting of the one candidate, a candidate corresponding to the probability distribution in which the mixture ratio is maximum among the plurality of candidates derived may be selected as the one candidate.

According to the aspect, the candidate corresponding to the probability distribution having the maximum mixture ratio is used as the action sequence of the agent, and thus it is possible to reduce a difference from the optimum action sequence. Accordingly, according to the aspect, it is possible to improve the learning method for controlling the agent such that an action sequence closer to the optimum action sequence is outputted.

For example, the mixture model may be a Gaussian mixture distribution.

According to the aspect, the Gaussian mixture distribution is particularly used as the mixture model, and thus it is possible to more easily derive the candidates from the variational inference. Accordingly, the learning method for controlling the agent can be more easily improved.

For example, the dynamics model may be an ensemble of a plurality of neural networks.

According to the aspect, an ensemble of multiple neural networks is used as the dynamics model, and thus it is possible to more easily establish the dynamics model having relatively high inference accuracy. Accordingly, the learning method for controlling the agent can be more easily improved.

Moreover, a recording medium according to an aspect of the present disclosure is a non-transitory computer-readable recording medium for use in a computer, the recording medium having a computer program recorded thereon for causing the computer to execute the learning method.

According to the aspect, the same advantageous effect as the foregoing learning method can be obtained.

These general and specific aspects may be implemented using a system, a method, an integrated circuit, a computer program, a computer-readable recording medium such as a CD-ROM, or any combination of systems, methods, integrated circuits, computer programs, or computer-readable recording media.

Hereinafter, the embodiment will be described with reference to the drawings.

The embodiment described below shows a general or specific example. The numerical value, shapes, materials, structural elements, the arrangement and connection of the structural elements, steps, the processing order of the steps etc. shown in the following embodiments are mere examples, and thus do not limit the scope of the present disclosure. Therefore, among the structural elements in the following embodiments, structural elements in the following embodiments, structural elements not recited in any one of the independent claims are described as arbitrary structural elements.

Embodiment

In the present embodiment, a learning device and a learning method that improve a learning method for controlling the action of an agent will be described.

Figure 1:
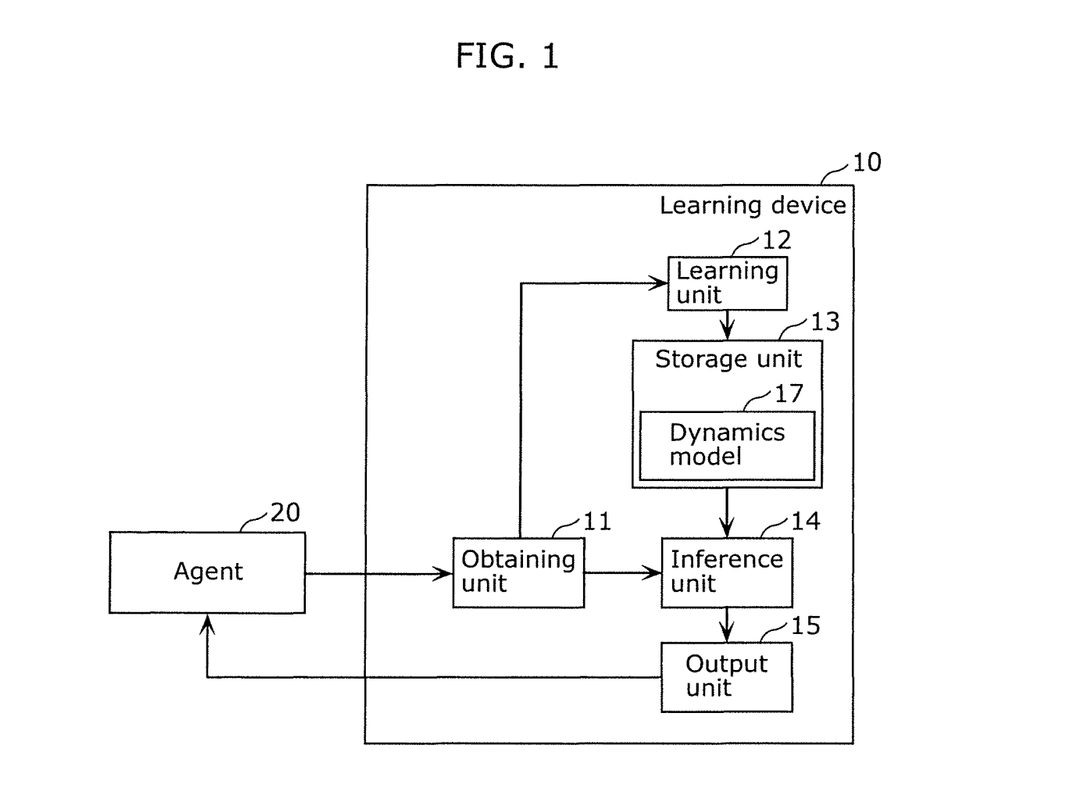
FIG. 1 is a block diagram illustrating the functional configuration of a learning device according to an embodiment.

FIG. 1 is a block diagram illustrating the functional configuration of learning device 10 according to the embodiment.

Learning device 10 shown in FIG. 1 is a device that learns the action of agent 20 using model-based reinforcement learning. Learning device 10 obtains information when agent 20 performs a series of actions, performs the model-based reinforcement learning using the obtained information, and controls the action of agent 20.

Agent 20 is a device that is selectively and sequentially placed into one of multiple states, and selectively and sequentially performs one of multiple actions. For example, agent 20 is an industrial machine with a robot arm that processes an object. In this case, the "state" corresponds to the coordinates of the robot arm, information about the object, information indicating a process status, and the like. The "action" corresponds to information for activating the robot arm (e.g. target position coordinates of the robot arm), information for changing the state of the industrial machine, and the like.

Agent 20 provides, to learning device 10, time series data indicating states and actions of agent 20 when a series of actions is performed. Agent 20 also can perform a series of actions in accordance with an action sequence outputted from learning device 10.

As shown in FIG. 1, learning device 10 includes obtaining unit 11, learning unit 12, storage unit 13, inference unit 14, and output unit 15. Each of the functional units in learning device 10 can be implemented by causing a central processing unit (CPU) included in learning device 10 to execute a predetermined program using a memory (not shown).

Obtaining unit 11 is a functional unit that obtains the time series data indicating information on agent 20 when agent 20 performs a series of actions. The information on agent 20 obtained by obtaining unit 11 includes at least the state and the action of agent 20. The action sequence of agent 20 obtained by obtaining unit 11 may be any other action sequence such as an action sequence defined in a random manner or an action sequence outputted by output unit 15 (described below).

Then, obtaining unit 11 may obtain, as the time series data, new time series data indicating states and actions of agent 20 by controlling agent 20 using the action sequence outputted by output unit 15 (described below). Obtaining unit 11 obtains one or more sets of time series data.

Learning unit 12 is a functional unit that establishes dynamics model 17 by performing supervised learning using the time series data obtained by obtaining unit 11. Learning unit 12 stores the established dynamics model 17 on storage unit 13.

Learning unit 12 uses a reward determined based on the action sequence of agent 20 when the supervised learning is performed. For example, when agent 20 is an industrial machine with a robot arm, a higher reward is determined for a more appropriate series of actions of the robot arm. Moreover, a higher reward is determined for a better quality of the object processed by the industrial machine.

An example of dynamics model 17 is an ensemble of multiple neural networks. In other words, learning unit 12 determines a filter coefficient (weight) for each of layers included in the multiple neural networks based on the same action sequence as the action sequence of agent 20 obtained by obtaining unit 11 or different action sequences which are some of the action sequences of agent 20 obtained by obtaining unit 11. In this case, the output of the ensemble of multiple neural networks is a result obtained by aggregating output data provided for input data for each of the multiple neural networks, using an aggregate function. The aggregate function can include various calculations such as average calculation which takes the average of output data of neural networks, or majority calculation which determines the majority of output data.

Storage unit 13 stores dynamics model 17 established by learning unit 12. Dynamics model 17 is stored by learning unit 12, and is read out by inference unit 14. Storage unit 13 is implemented by a memory or a storage device.

Inference unit 14 is a functional unit that derives multiple candidates for the action sequence of agent 20 based on dynamics model 17. Inference unit 14 uses variational inference using a mixture model as a variational distribution when the multiple candidates for the action sequence of agent 20 are derived. With this, inference unit 14 derives multiple action sequences as the action sequence of agent 20.

The mixture model used by inference unit 14 in the variational inference is, for example, a Gaussian mixture model. This case is taken as an example, but the mixture model is not limited to this. For example, a mixture categorical distribution is taken as an example of the mixture model when the action sequence is a vector composed of discrete values.

Output unit 15 is a functional unit that outputs the action sequence of agent 20. Output unit 15 outputs, as the action sequence of agent 20, one candidate selected from among multiple candidates derived by inference unit 14. For example, the action sequence outputted by output unit 15 is inputted to agent 20, and agent 20 will perform a series of actions in accordance with this action sequence.

It should be noted that the action sequence outputted by output unit 15 may be managed as numerical data in another device (not shown).

It should be noted that when multiple candidates are derived, inference unit 14 may derive, together with the multiple candidates, a mixture ratio of a probability distribution for each of the candidates to the entire mixture model. Moreover, when the one candidate is selected, output unit 15 may select, as the one candidate, a candidate corresponding to a probability distribution having the maximum mixture ratio to the entire mixture model.

Figure 2:
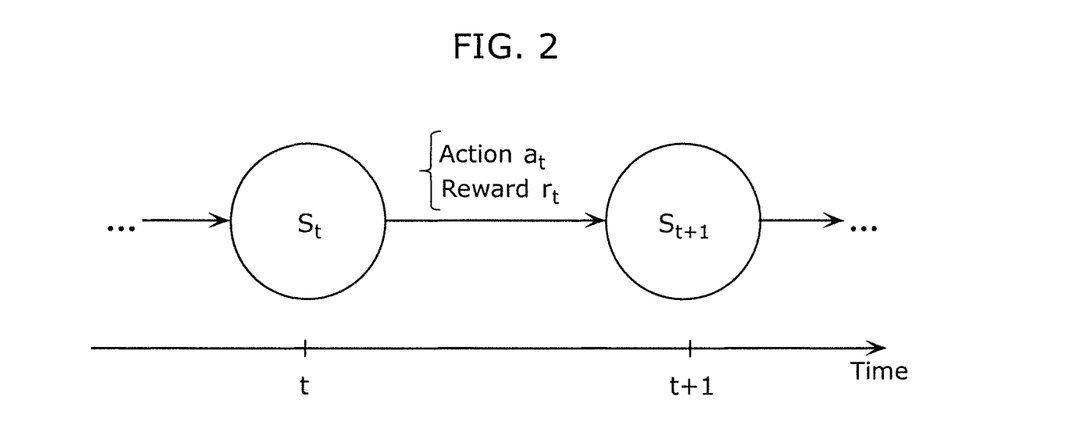
FIG. 2 is an explanatory diagram illustrating a time sequence in the state and action of an agent, according to the embodiment.

FIG. 2 is an explanatory diagram illustrating a time sequence in the state of agent 20, according to the embodiment.

In FIG. 2, state $S_t$ and state $S_{t+1}$ are shown as an example of the state sequence of agent 20. Here, the state of agent 20 at time t is denoted as $S_t$ and the state of agent 20 at time t+1 is denoted as $S_{t+1}$.

In addition, action $a_t$ shown in FIG. 2 denotes a series of actions performed by agent 20 in state $S_t$. Reward $r_t$ shown in FIG. 2 denotes a reward obtained by transition of agent 20 from $S_t$ to $S_{t+1}$.

Thus, the state and the action of agent 20, and the reward obtained by agent 20 can be illustrated schematically. Inference unit 14 derives an action sequence which maximizes the expected cumulative value of reward $r_t$ (also referred to as a cumulative reward) when agent 20 performs a series of actions $a_t$.

The following describes a method for deriving the action sequence using inference unit 14.

Figure 3:
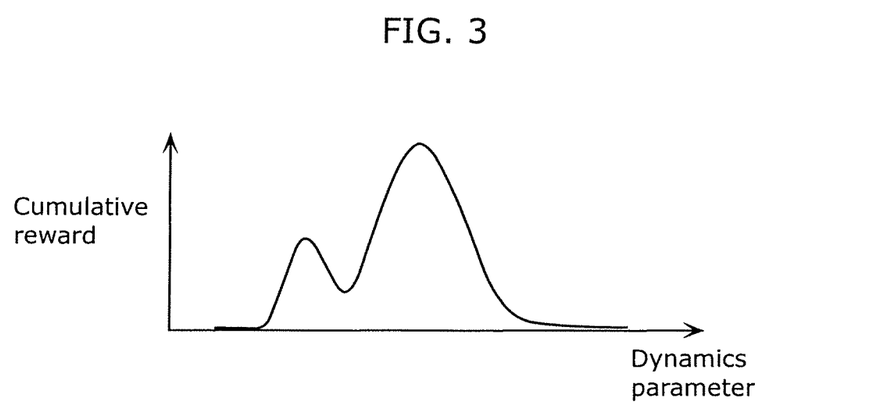
FIG. 3 is an explanatory diagram illustrating a variational distribution according to the embodiment.

FIG. 3 is an explanatory diagram illustrating a cumulative reward for each action sequence according to the present embodiment. Here, the case where the action sequence is a vector composed of continuous values is described as an example, but the same is applied to a vector composed of discrete values.

FIG. 3 is a graph having a horizontal axis indicating an action sequence, and a vertical axis indicating the cumulative reward with respect to the action sequence. As shown in FIG. 3, the cumulative reward typically has multiple local maxima with respect to the action sequence.

Figure 4:
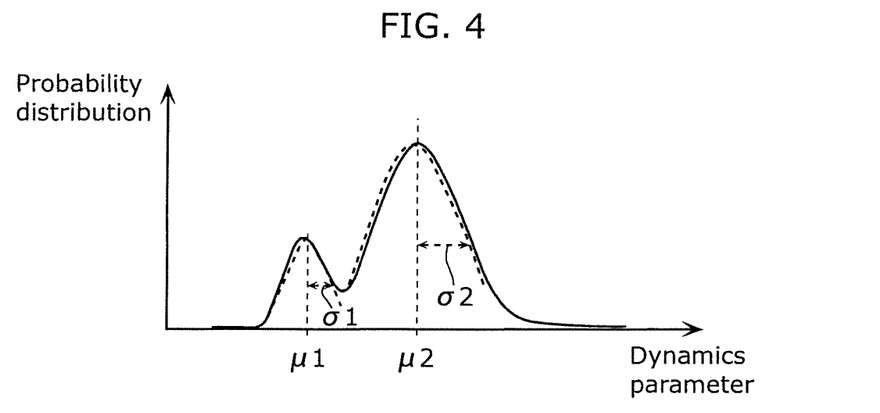
FIG. 4 is an explanatory diagram illustrating the concept of variational inference performed by an inference unit according to the embodiment.

FIG. 4 is an explanatory diagram illustrating the concept of variational inference performed by inference unit 14 according to the present embodiment.

FIG. 4 is a graph having a horizontal axis indicating an action sequence, and a vertical axis indicating a probability distribution corresponding to the action sequence. It should be noted that the probability distribution indicated by the vertical axis of FIG. 4 can be obtained by converting the cumulative reward indicated by the vertical axis of FIG. 3 using a predetermined calculation.

Inference unit 14 performs the variational inference using a Gaussian mixture model (GMM) as the variational distribution to derive candidates for an optimum action sequence of agent 20.

The solid line shown in FIG. 4 is obtained by converting the cumulative reward with respect to the action sequence shown in FIG. 3 into the probability distribution. As an approach for converting the cumulative reward into the probability distribution, a method for mapping the cumulative reward using an exponential function is taken as an example.

The dotted line shown in FIG. 4 denotes a Gaussian mixture distribution, i.e. a probability distribution of the mixture (composition) of multiple Gaussian distributions. The Gaussian mixture distribution is determined by parameter sets including the average, the variance, and the peak for each of the Gaussian distributions included in the Gaussian mixture distribution.

Inference unit 14 determines the parameter sets of the Gaussian mixture distribution using the variational inference.

Specifically, inference unit 14 repeatedly performs the calculation for determining the parameter sets of the Gaussian mixture distribution such that a difference between the probability distribution denoted by the dotted line (the Gaussian mixture distribution) and the probability distribution denoted by the solid line in FIG. 4 is reduced. The number of times that the calculation is performed may be determined in any manner. For example, the repetition may be terminated when the improvement ratio of the cumulative reward for every repetition converges to a constant value (e.g. plus/minus 1%).

Inference unit 14 performs the variational inference as described above to determine the parameter set for each of the Gaussian distributions included in the Gaussian mixture distribution. Each Gaussian distribution determined corresponds to a different action sequence, and thus the determining of the parameter sets means that inference unit 14 derives the candidates for the action sequence of agent 20.

In the example of FIG. 4, inference unit 14 obtains, as the parameter sets for two Gaussian distributions, averages μ1 and μ2, variances σ1 and σ2, and mixture ratios n1 and n2. The action sequence parameter sets determined as described above become the candidates for the action sequence of agent 20.

Hereinafter, the variational inference performed by inference unit 14 is described in comparison with variatioinal inference according to the related art. The variational inference according to the related art uses a single model (e.g., a single Gaussian distribution) instead of the mixture model (i.e., the Gaussian mixture distribution).

Figure 5:
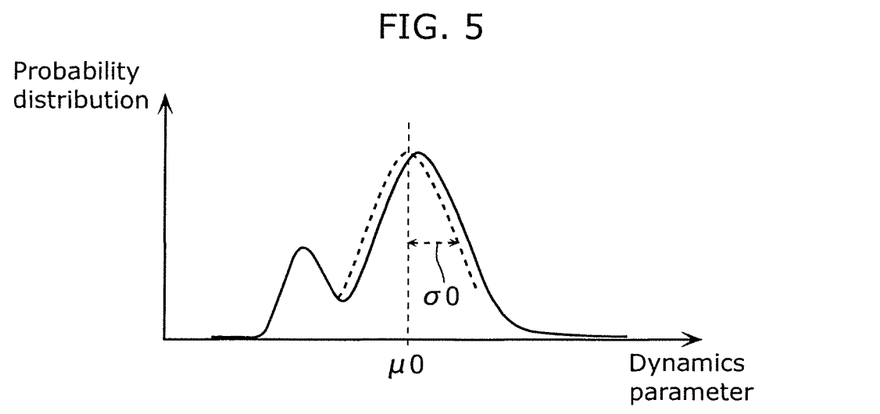
FIG. 5 is an explanatory diagram illustrating the concept of variational inference performed by an inference unit according to the related art.

FIG. 5 is an explanatory diagram illustrating the concept of the variational inference according to the related art. The vertical axis and the horizontal axis in FIG. 5 denote the same as in FIG. 4.

The inference unit according to the related art derives a candidate for an optimal action sequence of agent 20 by performing the variational inference using a Gaussian distribution (i.e., a signal Gaussian distribution which is not a Gaussian mixture distribution) as a variational distribution.

The dotted line shown in FIG. 5 denotes the Gaussian distribution. The Gaussian distribution is determined by a set of the average, the variance, and the peak of a probability distribution.

Inference unit determines the above parameter set of the Gaussian distribution using the variational inference.

Specifically, inference unit repeatedly performs the calculation for determining the parameter set of the Gaussian distribution such that a difference between the probability distribution denoted by the dotted line (the Gaussian distribution) and the probability distribution denoted by the solid line in FIG. 5 is reduced. The number of times that the calculation is performed is the same as that of inference unit 14.

With this, the inference unit obtains only one action sequence μ0.

As shown in FIG. 4 and FIG. 5, a difference between the variational distribution denoted by the dotted line (corresponding to the Gaussian mixture distribution in FIG. 4 and the Gaussian distribution in FIG. 5) and the probability distribution denoted by the solid line (the probability distribution corresponding to the action sequence) tends to be smaller in the case where the Gaussian mixture distribution is used (see FIG. 4). This is because when the Gaussian mixture distribution is used, the difference from the probability distribution denoted by the solid line can be reduced by adjusting the parameter set for each of the Gaussian distributions.

Figure 6:
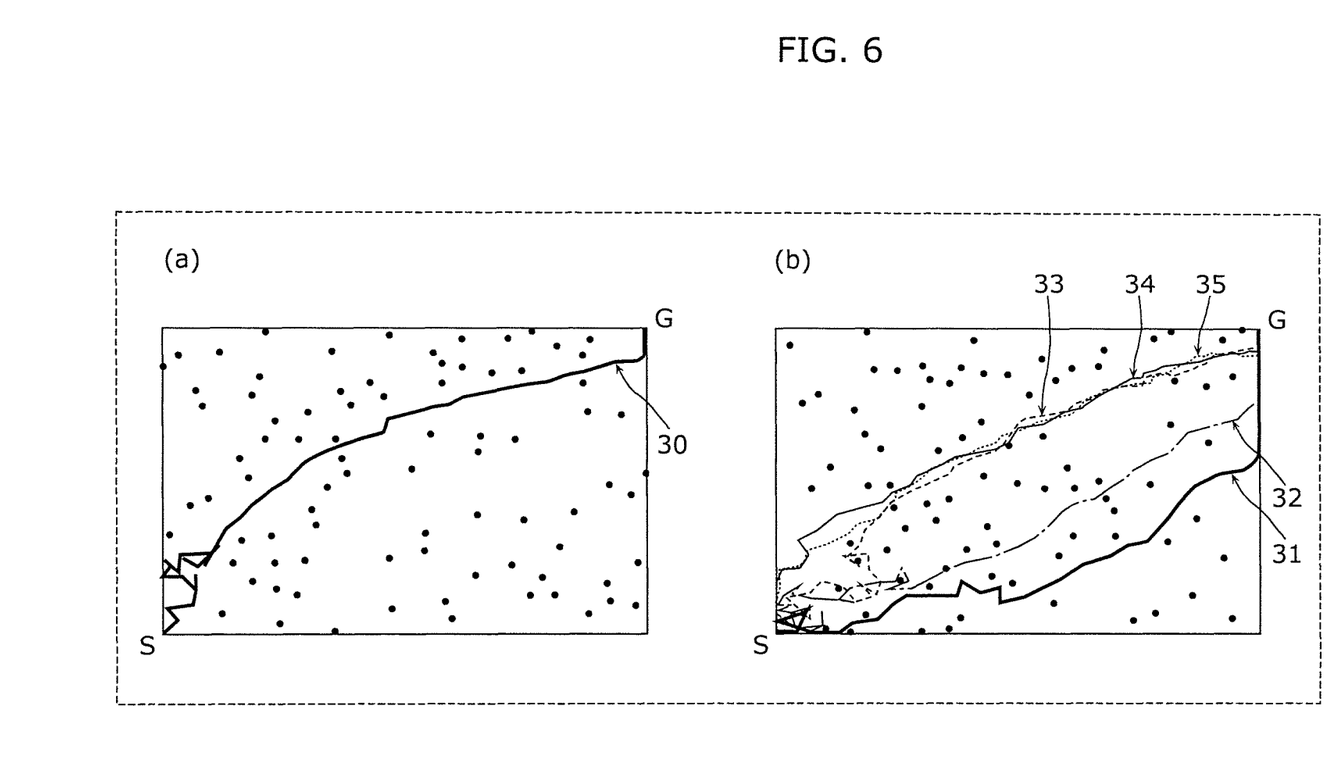
FIG. 6 is an explanatory diagram illustrating candidates determined by the inference unit according to the embodiment in comparison with the case of the related art.

FIG. 6 is an explanatory diagram schematically illustrating the candidates determined by inference unit 14 according to the present embodiment.

Here, a path search is described as an example. This search is to move ahead within the rectangular region in FIG. 6 while avoiding the obstacle shown by the black circle (•), and derive a path from the start ("S" in this drawing) to the goal ("G" in this drawing). The traveling direction at each point on the path corresponds to the "action".

In FIG. 6, multiple paths derived by inference unit 14 are described in comparison with one path derived by the inference unit according to the related art.

Part (a) of FIG. 6 shows one path 30 derived by the inference unit according to the related art. One path 30 shown in part (a) of FIG. 6 corresponds to one action sequence μ0 shown in FIG. 5.

Part (b) of FIG. 6 shows multiple paths 31, 32, 33, 34, and 35 derived by inference unit 14 according to the present embodiment. Here, the case where inference unit 14 uses the Gaussian mixture distribution obtained by mixing five Gaussian distributions as the variational distribution is illustrated as an example. In this case, the number of derived paths is five.

Moreover, in part (b) of FIG. 6, the width of the line such as path 31 represents a mixture ratio of the Gaussian distribution corresponding to the path to the Gaussian mixture distribution. In this example, the width of the line of path 31 is wider than those of the other lines, and thus it is found that the mixture ratio of the Gaussian distribution corresponding to path 31 is higher than those of the other paths 32 to 35.

Output unit 15 can output one path selected from among paths shown in part (b) of FIG. 6, such as path 31.

Figure 7:
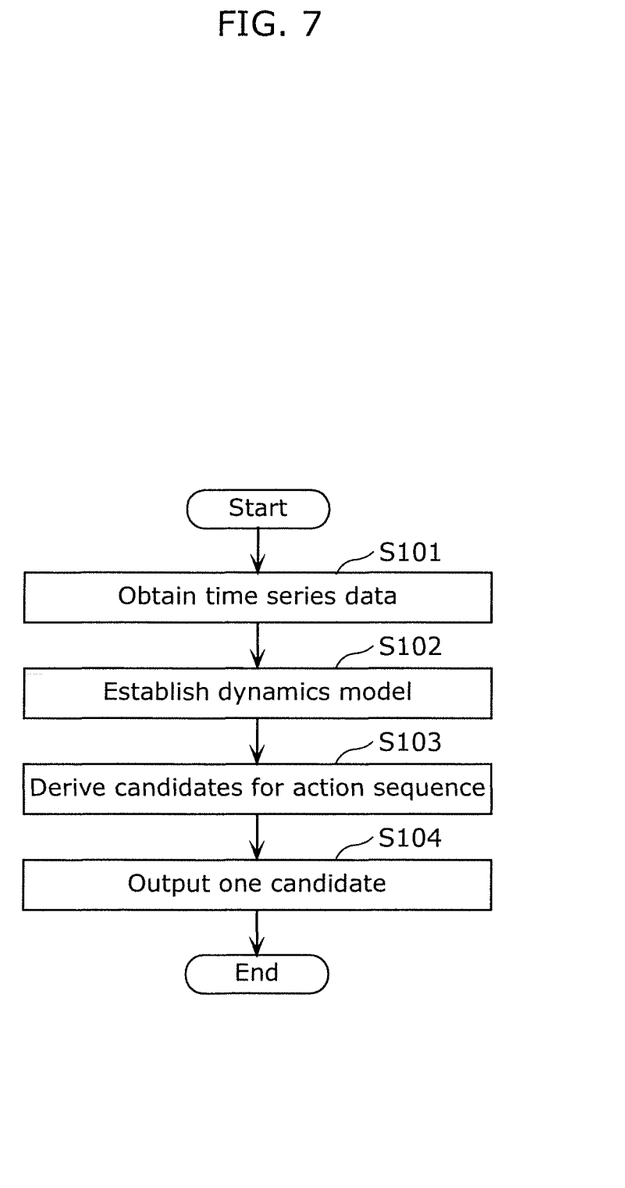
FIG. 7 is a flow chart illustrating a learning method according to the embodiment.

FIG. 7 is a flow chart illustrating a learning method performed by learning device 10 according to the present embodiment. This learning method is a learning method for learning the action of agent 20 using model-based reinforcement learning.

As shown in FIG. 7, at step S101, time series data indicating states and actions of agent 20 when agent 20 performs a series of actions is obtained.

At step S102, dynamics model 17 is established by performing supervised learning using the time series data obtained at step S101.

At step S103, multiple candidates for the action sequence of agent 20 are derived based on dynamics model 17 from the variational inference using a mixture model as the variational distribution.

At step S104, one candidate selected from among the derived candidates is outputted as the action sequence of agent 20.

With the above processing, learning device 10 improves the learning method for controlling the action of agent 20.

The following describes an advantageous effect of the learning method according to the present embodiment.

Figure 8:
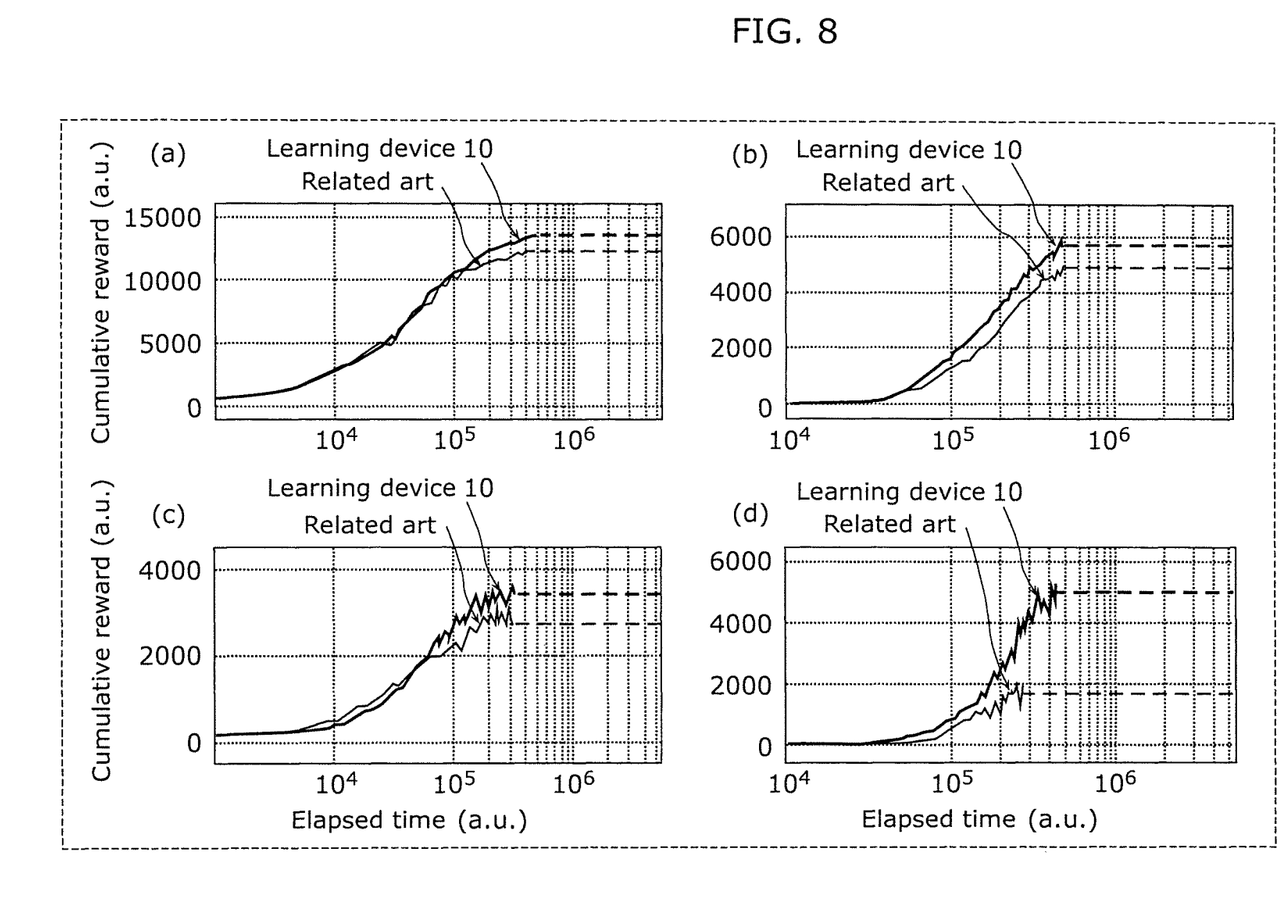
FIG. 8 is an explanatory diagram illustrating a temporal change in the cumulative reward of the learning method according to the embodiment in comparison with the related art.

FIG. 8 is an explanatory diagram illustrating a temporal change in the cumulative reward of the learning method according to the present embodiment in comparison with the related art.

Regarding the cumulative reward when learning is performed by learning device 10 according to the present embodiment, an example of the simulation result obtained by an existing simulator is shown. The existing simulator is physics computation engine MuJoCo. Parts (a) to (d) of FIG. 8 are results of four different tasks (i.e., HalfCheetah, Ant, Hopper, and Walker2d) provided in the evaluation platform "OpenAI Gym" for reinforcement learning which operates on the above simulator.

The bold solid line shown in FIG. 8 represents a change in cumulative reward of learning device 10 according to the present embodiment. Moreover, the thin solid line shown in FIG. 8 represents a change in cumulative reward of the learning device according to the related art. Moreover, a convergence value for each change in the cumulative reward is denoted by a dotted line.

As shown in FIG. 8, in all the tasks shown in parts (a) to (d) of FIG. 8, learning device 10 according to the present embodiment starts to increase the cumulative reward earlier with respect to the elapsed time and converges to a convergence value in shorter time than the learning device according to the related art (i.e., the convergence speed is high). Moreover, learning device 10 according to the present embodiment has a larger convergence value of the cumulative reward than the learning device according to the related art.

This shows that learning device 10 according to the present embodiment provides more improved learning performance than the learning device according to the related art.

Figure 9:
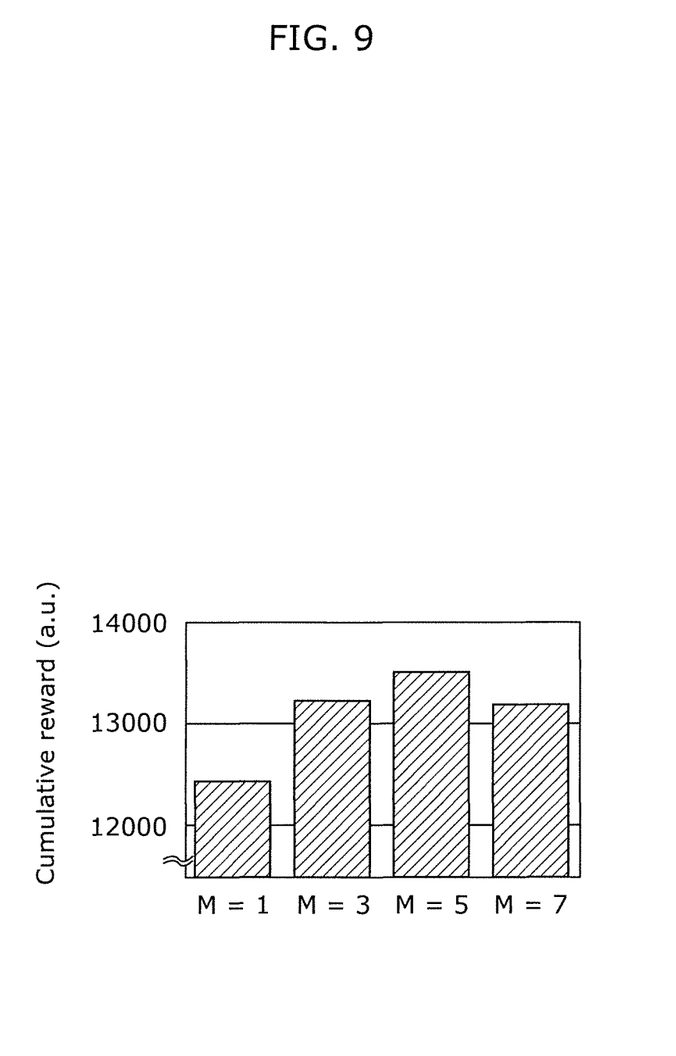
FIG. 9 is an explanatory diagram illustrating a convergence value of the cumulative reward of the learning method according to the embodiment in comparison with the related art.

FIG. 9 is an explanatory diagram illustrating a convergence value of the cumulative reward of the learning method according to the present embodiment in comparison with the related art. FIG. 9 shows, in the task of "HalfCheetah", a convergence value of the cumulative reward with respect to M which is the number of Gaussian distributions included in the Gaussian mixture distribution.

It should be noted that the case of M=1 corresponds to the single Gaussian distribution, i.e., the learning method according to the related art. Moreover, the case of M=3, 5, or, 7 corresponds to the Gaussian mixture distribution, i.e., the learning method according to the present embodiment.

As shown in FIG. 9, the case where the variational inference performed using the Gaussian mixture distribution (M=3, 5, or 7) has a larger convergence value of the cumulative reward than the case where the variational inference performed using the single Gaussian distribution (M=1). Moreover, the convergence value varies depending on the value of M. It should be noted that the convergence value of the cumulative reward is capable of varying depending on: a method for defining the reward; a type of task; or the like.

As described above, the learning method according to the present embodiment performs the variational inference using the mixture model as the variational distribution, and thus it is possible to derive multiple candidates for the action sequence of the agent. Each of the candidates for the action sequence derived in such a manner has a smaller difference from the optimum action sequence and converges earlier in deriving of the candidates than the case where the variational inference is performed using a single model as the variational distribution. One of the derived candidates for the action sequence will be used as the action sequence of the agent. With this, a more appropriate action sequence can be outputted in a shorter time. Thus, according to the above aspect, it is possible to improve the learning method for controlling the agent.

Moreover, the state and the action of the agent controlled using the action sequence outputted as the result of the learning are used in the next learning, and thus it is possible to make an action sequence to be established as the result of the learning more appropriate. Thus, the learning method for controlling the agent can be further improved.

Moreover, the candidate corresponding to the probability distribution having the maximum mixture ratio is used as the action sequence of the agent, and thus it is possible to reduce a difference from the optimum action sequence. Accordingly, according to the above aspect, it is possible to improve the learning method for controlling the agent such that an action sequence closer to the optimum action sequence is outputted.

Moreover, the Gaussian mixture distribution is particularly used as the mixture model, and thus it is possible to more easily derive the candidates from the variational inference. Accordingly, the learning method for controlling the agent can be more easily improved.

Moreover, an ensemble of multiple neural networks is used as the dynamics model, and thus it is possible to more easily establish the dynamics model having relatively high inference accuracy. Accordingly, the learning method for controlling the agent can be more easily improved.

Each of the structural elements in the embodiment may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software for implementing the learning method and the like according to the foregoing embodiment is the following program.

In other words, this program causes a computer to execute a learning method for learning an action of an agent using model-based reinforcement learning. The learning method includes: obtaining time series data indicating states and actions of the agent when the agent performs a series of actions; establishing a dynamics model by performing supervised learning using the time series data obtained; deriving a plurality of candidates for an action sequence of the agent from variational inference using a mixture model as a variational distribution, based on the dynamics model; and outputting, as the action sequence of the agent, one candidate selected from among the plurality of candidates derived.

Although the learning method and the like according to one or more aspects have been described based on the embodiment, the present disclosure is not limited to the above-described embodiment. Various modifications to the embodiment that can be conceived by those skilled in the art, and forms configured by combining structural components in different embodiments without departing from the spirit of the present disclosure may be included in the scope of the one or more aspects.

Although only one exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to a learning device for controlling the action of an agent.

The invention claimed is:

1. A learning method for learning an action of an agent using model-based reinforcement learning, the learning method comprising:
obtaining time series data indicating states and actions of the agent when the agent performs a series of actions;
establishing a dynamics model by performing supervised learning using the time series data obtained;
deriving a plurality of candidates for an action sequence of the agent from variational inference using a mixture model as a variational distribution, based on the dynamics model; and
outputting, as the action sequence of the agent, one candidate selected from among the plurality of candidates derived, wherein
the mixture model is formed by adding up a plurality of probability distributions, the plurality of probability distributions being respectively multiplied by a plurality of mixture ratios,
in the deriving of the plurality of candidates, the plurality of mixture ratios are derived together with the plurality of candidates, and
in the selecting of the one candidate, a candidate corresponding to the probability distribution, from among the plurality of probability distributions, multiplied by the maximum mixture ratio, from among the plurality of mixture ratios, is selected as the one candidate.

2. The learning method according to claim 1, further comprising:
obtaining, as the time series data, new time series data indicating states and actions of the agent when the agent performs a series of actions in accordance with the action sequence outputted.

3. The learning method according to claim 1, wherein the mixture model is a Gaussian mixture distribution.

4. The learning method according to claim 1, wherein the dynamics model is an ensemble of a plurality of neural networks.

5. A non-transitory computer-readable recording medium for use in a computer, the recording medium having a computer program recorded thereon for causing the computer to execute the learning method according to claim 1.

* * * * *